US012065177B2

(12) United States Patent
Liu

(10) Patent No.: US 12,065,177 B2
(45) Date of Patent: Aug. 20, 2024

(54) METHOD OF PRESENTING INFORMATION FOR VEHICLE, ELECTRONIC DEVICE, AND STORAGE MEDIUM

(71) Applicant: APOLLO INTELLIGENT CONNECTIVITY (BEIJING) TECHNOLOGY CO., LTD., Beijing (CN)

(72) Inventor: Yunfeng Liu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 392 days.

(21) Appl. No.: 17/535,056

(22) Filed: Nov. 24, 2021

(65) Prior Publication Data
US 2022/0081007 A1    Mar. 17, 2022

(30) Foreign Application Priority Data
Nov. 25, 2020    (CN) .......................... 202011341975.2

(51) Int. Cl.
*G01C 22/00*    (2006.01)
*B60K 35/00*    (2006.01)
(Continued)

(52) U.S. Cl.
CPC ......... *B60W 60/0051* (2020.02); *B60K 35/00* (2013.01); *B60W 50/0205* (2013.01);
(Continued)

(58) Field of Classification Search
CPC ......... B60W 60/0051; B60W 50/0205; B60W 50/14; B60W 2540/215; B60W 2050/146;
(Continued)

(56) References Cited

U.S. PATENT DOCUMENTS 9,688,288 B1    6/2017   Lathrop et al.
2014/0156182 A1*  6/2014   Nemec .................. G08G 1/16
                                                        701/461
(Continued)

FOREIGN PATENT DOCUMENTS

CN    103383265    11/2013
CN    107123175     9/2017
(Continued)

OTHER PUBLICATIONS

Office Action issued in corresponding Chinese Patent Application No. 202011341975.2, dated Aug. 18, 2023.
(Continued)

*Primary Examiner* — Adam M Alharbi
(74) *Attorney, Agent, or Firm* — Pillsbury Winthrop Shaw Pittman, LLP

(57) ABSTRACT

The present disclosure provides a method of presenting information for vehicle, an electronic device, and a storage medium, which are applied to a field of automatic driving, intelligent transportation, and navigation technology. The specific implementation scheme is: acquiring a target navigation path, wherein the target navigation path includes a plurality of road segments; acquiring operation information of an automatic driving system of a vehicle, in response to determining that the plurality of road segments include a target road segment that allows automatic driving; and controlling the vehicle to present the target navigation path and a touch object used to switch an operation state of the automatic driving system, in response to the operation information indicating that the automatic driving system is in a normal state, wherein the target road segment in the presented target navigation path is highlighted.

20 Claims, 6 Drawing Sheets

(51) Int. Cl.
  *B60W 50/02* (2012.01)
  *B60W 50/14* (2020.01)
  *B60W 60/00* (2020.01)
  *G01C 21/36* (2006.01)
  *G08G 1/0969* (2006.01)
  *B60K 35/10* (2024.01)
  *B60K 35/28* (2024.01)

(52) U.S. Cl.
  CPC ......... *B60W 50/14* (2013.01); *G01C 21/3676* (2013.01); *G08G 1/0969* (2013.01); *B60K 35/10* (2024.01); *B60K 35/28* (2024.01); *B60K 2360/143* (2024.01); *B60K 2360/166* (2024.01); *B60K 2360/175* (2024.01); *B60K 2360/178* (2024.01); *B60W 2050/146* (2013.01); *B60W 2540/215* (2020.02)

(58) Field of Classification Search
  CPC .. B60K 35/00; B60K 2360/178; B60K 35/28; B60K 2360/166; B60K 2360/143; B60K 35/10; B60K 2360/175; G01C 21/3676; G08G 1/0969
  See application file for complete search history.

(56) References Cited

U.S. PATENT DOCUMENTS

| | | | | |
|---|---|---|---|---|
| 2016/0311323 | A1* | 10/2016 | Lee | G06F 3/013 |
| 2018/0093676 | A1* | 4/2018 | Emura | B60W 60/0027 |
| 2018/0136655 | A1* | 5/2018 | Kim | H04W 4/44 |
| 2019/0248379 | A1 | 8/2019 | Peterson et al. | |

FOREIGN PATENT DOCUMENTS

| | | |
|---|---|---|
| CN | 107298105 | 10/2017 |
| CN | 108827337 | 11/2018 |
| CN | 109795492 | 5/2019 |
| CN | 110207719 | 9/2019 |
| CN | 110264720 | 9/2019 |
| CN | 110809538 | 2/2020 |
| CN | 110884495 | 3/2020 |
| CN | 111016927 | 4/2020 |
| EP | 3330826 | 6/2018 |
| JP | 2015206655 | 11/2015 |
| JP | 2017102007 | 6/2017 |
| JP | 2019038474 | 3/2019 |
| JP | 2020153939 | 9/2020 |
| KR | 20180026243 | 3/2018 |

OTHER PUBLICATIONS

Office Action issued in corresponding Korean Patent Application No. 10-2021-0154025, dated Oct. 16, 2023.
Extended European Search Report issued in corresponding European Patent Application No. 21210464.0, dated Apr. 21, 2022.
Japanese Office Action issued in Japanese Patent Application No. 2021-181616, dated Dec. 28, 2022.
Office Action issued in corresponding Chinese Patent Application No. 202011341975.2, dated May 16, 2023.

* cited by examiner

METHOD OF PRESENTING INFORMATION FOR VEHICLE, ELECTRONIC DEVICE, AND STORAGE MEDIUM

This application is claims priority to Chinese Patent Application No. 202011341975.2, filed on Nov. 25, 2020, which is incorporated herein in its entirety by reference.

TECHNICAL FIELD

The present disclosure relates to a field of information processing technology, specifically to fields of automatic driving, intelligent transportation, and navigation technology, and in particular to a method of presenting information for a vehicle, an electronic device, and a storage medium.

BACKGROUND

In order to improve traffic efficiency, vehicles have gradually entered an electronic age. With the development of computer technology and Internet technology, automatic driving has gradually become possible.

SUMMARY

At the current stage of the development of automatic driving, in order to improve the safety of automatic driving, only certain road segments may be allowed to be driven automatically. In a process of vehicle driving, users would typically be required to determine whether a current road segment allows automatic driving or not based on experience. Even if there is a pre-marked road segment that allows automatic driving, users may only be prompted to enter an automatic driving state through a dashboard, and users may not perceive information such as a location of the vehicle and a length of a road segment that may be driven automatically.

According to an aspect, there is provided a method of presenting information for a vehicle, the method including: acquiring a target navigation path, in which the target navigation path includes a plurality of road segments; acquiring operation information of an automatic driving system of the vehicle, in response to determining that the plurality of road segments include a target road segment that allows automatic driving; and controlling the vehicle to present the target navigation path and a touch object used to switch an operation state of the automatic driving system, in response to the operation information indicating that the automatic driving system is in a normal state, in which the target road segment in the presented target navigation path is highlighted.

According to an aspect, there is provided an electronic device including: at least one processor; and a memory communicatively connected to the at least one processor, in which the memory stores instructions executable by the at least one processor, and the instructions, when executed by the at least one processor, cause the at least one processor to perform the method of presenting information for a vehicle provided by the present disclosure.

According to an aspect, there is provided a non-transitory computer-readable storage medium having computer instructions therein, the computer instructions, when executed by a computer system, cause the computer system to perform the method of presenting information for a vehicle provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the present disclosure and do not constitute a limitation to the present disclosure, in which.

DETAILED DESCRIPTION OF EMBODIMENTS

The following describes exemplary embodiments of the present disclosure with reference to the accompanying drawings, which include various details of embodiments of the present disclosure to facilitate understanding, and should be regarded as merely exemplary. Therefore, those ordinary skilled in the art should achieve that various changes and modifications may be made to embodiments described herein without departing from the scope and spirit of the present disclosure. Likewise, for clarity and conciseness, descriptions of well-known functions and structures are omitted in the following description.

This present disclosure provides a method of presenting information for a vehicle, and the method includes: acquiring a target navigation path, in which the target navigation path includes a plurality of road segments; acquiring operation information of an automatic driving system of the vehicle, in response to determining that the plurality of road segments include a target road segment that allows automatic driving; and controlling the vehicle to present the target navigation path and a touch object used to switch an operation state of the automatic driving system, in response to the operation information indicating that the automatic driving system is in a normal state, in which the target road segment in the presented target navigation path is highlighted. In this way, a navigation technology and an automatic driving technology are combined, in order to provide an intuitive experience to users in automatic driving.

Figure 1:
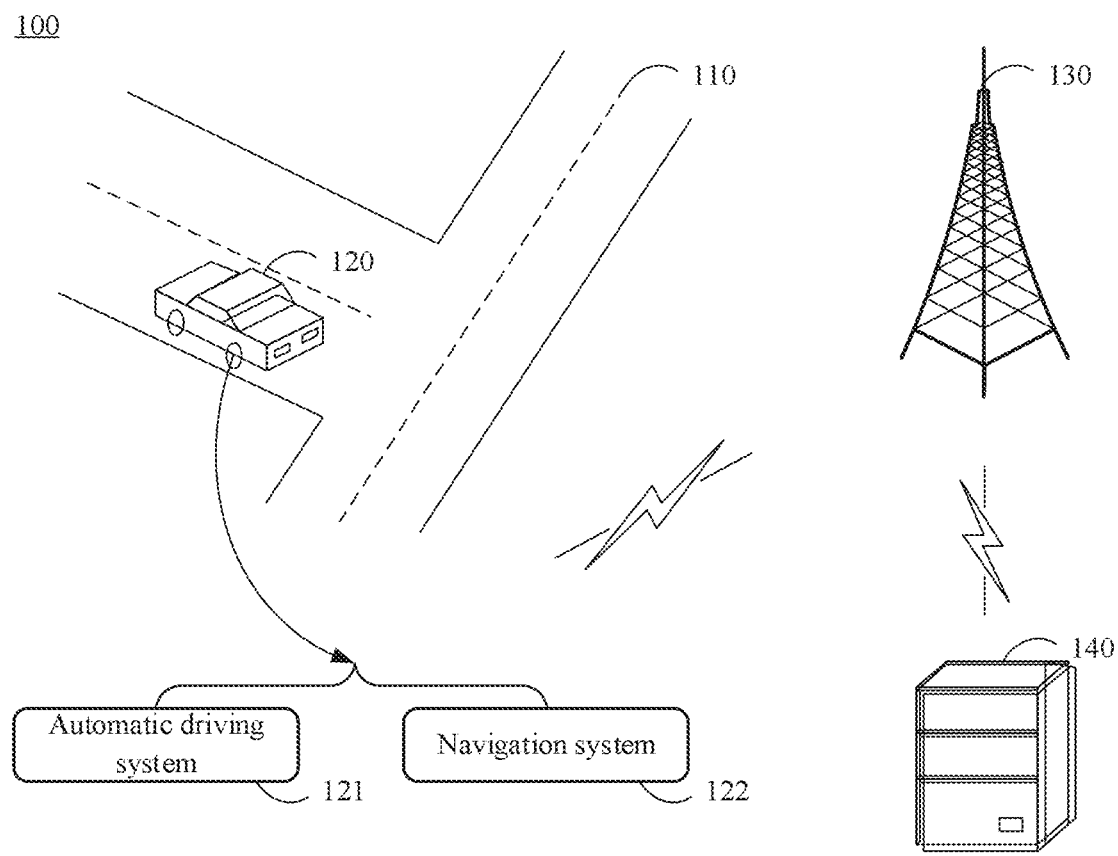
FIG. 1 shows a schematic diagram of an application scenario of a method and an apparatus of presenting information for a vehicle, an electronic device, and a storage medium according to embodiments of the present disclosure.

The following will describe an application scenario of a method and a device provided in the present disclosure with reference to FIG. 1.

FIG. 1 shows a schematic diagram of an application scenario of a method and apparatus of presenting information for a vehicle, an electronic device, and a storage medium according to embodiments of the present disclosure.

As shown in FIG. 1, an application scenario 100 of this embodiment may include, for example, a road 110, a vehicle 120, a signal base station 130, and a server 140.

According to embodiments of the present disclosure, a smart device may be provided in the vehicle 120, for example, and the smart device may have a display screen and may be installed with a client application, so as to provide auxiliary functions to the vehicle 120. The client application may include, for example, an application for controlling the operation of an automatic driving system 121 installed on the vehicle. The smart device may further include a navigation system 122, and a navigation map provided by the navigation system 122 may be presented via the display screen. It may be understood that the smart device may be, for example, an electronic device such as an on-board computer.

For example, the application that controls the operation of the automatic driving system 121 may communicate with the navigation system 122, for example, through a communication protocol, so that the application that controls the operation of the automatic driving system 121 controls the operation of the automatic driving system 121 according to navigation information provided by the navigation system 122.

For example, the automatic driving system 121 may include, for example, a camera, a laser radar, a position sensor, a laser rangefinder, and the like. The camera is used to recognize traffic signals, etc., and to identify moving objects with the assistance of an application that controls the operation of the automatic driving system 121 in a smart device. A radar sensor is used to scan an environment surrounding the vehicle and return a scan result to the smart device, so that the smart device may determine the environment in which the vehicle is located according to the scan result, so as to control the operation of a vehicle driving system according to the environment and achieve the automatic driving of the vehicle. The position sensor is used to help the smart device to locate the vehicle by measuring a lateral movement of the vehicle, so as to determine a correct position of the vehicle on the road. The laser rangefinder is used to measure a distance between the vehicle and various objects in the front, rear, left, and right of the vehicle, so as to return more detailed information about the environment surrounding the vehicle to the smart device.

According to embodiments of the present disclosure, as shown in FIG. 1, the application scenario 100 may further include the signal base station 130 and the server 140, for example. The navigation system 122 installed in the smart device in the vehicle 120 may establish a communication connection with the server 140 via the signal base station 130, for example.

For example, the server 140 may be a background server that provides support for the operation of the client application in the smart device. For example, the server may be an application server, a distributed system server, or a server combined with a block-chain. For example, the server may also be a virtual server or a cloud server, for example.

For example, the navigation system 122 in the smart device may transmit a path acquisition request to the server 140 in response to a user inputting a start position and an end position. The server 140 may plan to obtain a candidate navigation path according to a pre-stored electronic map, the start position, and the end position, and return the candidate navigation path to the navigation system, such that the candidate navigation path is presented to the user through the display screen of the smart device in order be selected by the user.

It should be noted that the method of presenting information for a vehicle provided by embodiments of the present disclosure may generally be performed by a smart device in the vehicle 120. Accordingly, the apparatus of presenting information for a vehicle provided by embodiments of the present disclosure may generally be provided in the vehicle 120.

It should be understood that the types of vehicles, communication base stations, and servers in FIG. 1 are only schematic. It may have any type of vehicles, communication base stations, and servers according to needs of implementation.

In the following, a method of presenting information for a vehicle provided by embodiments of the present disclosure will be described in detail through FIGS. 2 to 5 in conjunction with the application scenario described in FIG. 1.

Figure 2:
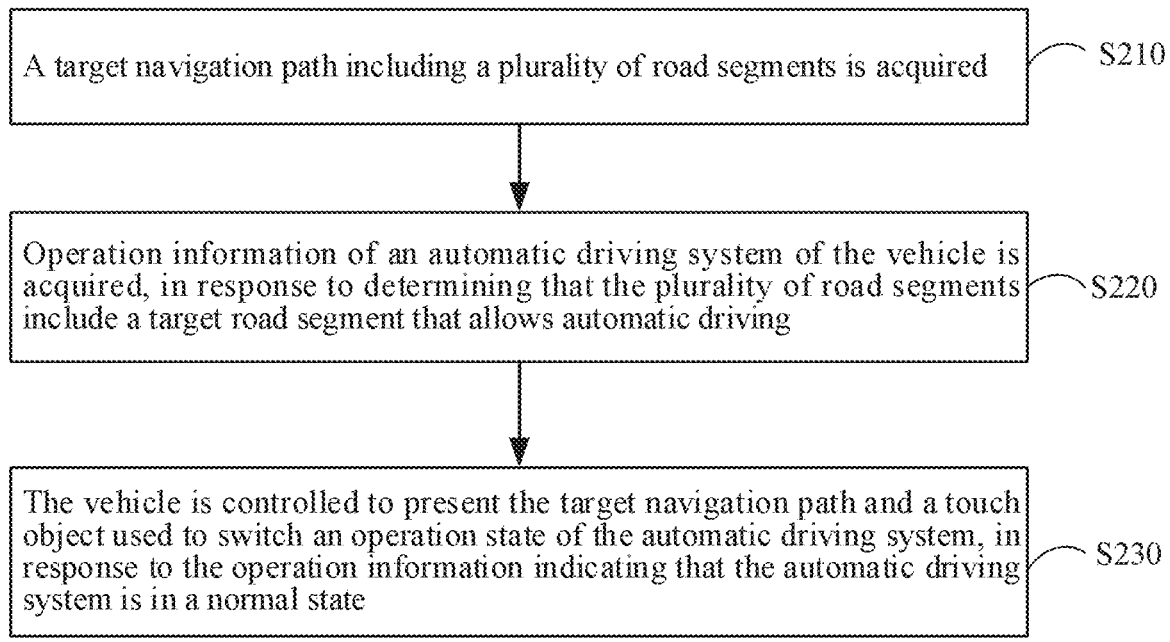
FIG. 2 shows a schematic flowchart of a method of presenting information for a vehicle according to embodiments of the present disclosure.

FIG. 2 shows a schematic flowchart of a method of presenting information for a vehicle according to embodiments of the present disclosure.

As shown in FIG. 2, a method 200 of presenting information for a vehicle of this embodiment may include operation S210 to operation S230.

In operation S210, a target navigation path including a plurality of road segments is acquired.

According to embodiments of the present disclosure, the target navigation path may be acquired, for example, according to the start position and the end position inputted by the user. The target navigation path may be acquired by, for example, transmitting an acquisition request from the navigation system of the vehicle to the server. The target navigation path may be such a navigation path that the predicted time consumption for the vehicle to travel through the navigation path is the shortest among the plurality of navigation paths determined by the server according to the start position and the end position. Alternatively, the target navigation path may be a navigation path with a shortest path length among a plurality of navigation paths determined by the server. Alternatively, the target navigation path may be a navigation path with a longest road segment that allows automatic driving among a plurality of navigation paths determined by the server.

For example, after the server determines the plurality of navigation paths, the plurality of navigation paths may be transmitted to the smart device in the vehicle, and the smart device in the vehicle determines one of the plurality of navigation paths as the target navigation path according to rules described above. Alternatively, after the smart device in the vehicle receives the plurality of navigation paths, the display screen of the smart device may be controlled to present a plurality of the navigation paths to the user, and a path selected by the user is determined as the target navigation path.

In operation S220, operation information of an automatic driving system of the vehicle is acquired, in response to determining that the plurality of road segments include a target road segment that allows automatic driving.

According to embodiments of the present disclosure, after acquiring the target navigation path, for example, it may be first determined whether the plurality of road segments include a target road segment that allows automatic driving or does not include such a target road segment according to road segment information of each of the plurality of road segments included in the target navigation path. The road segment information includes a starting point of a road segment, an ending point of the road segment, a radius of curvature of the road segment, a type of a road (auxiliary road, main road, elevated road, ramp) where the road segment is located, a maximum vehicle speed allowed on the road segment, allowance of automatic driving by the road segment and/or the like. The road segment information of each of the plurality of road segments included in the target navigation path may be acquired while acquiring the target navigation path.

According to embodiments of the present disclosure, when it is determined that the plurality of road segments include a target road segment, the navigation system may call an API interface provided by the application that controls the operation of the automatic driving system via the smart device, to obtain operation information of the respective device(s) in the automatic driving system. For example, the application that controls the operation of the automatic driving system may be communicatively connected to the respective device(s) in the automatic driving system via the smart device and through a CAN bus. If the application successfully communicates with respective device(s) in the automatic driving system through the CAN bus, it may be determined that the respective device(s) is able to operate normally. When all the device(s) in the automatic driving system are able to operate normally, it may be determined that the operation information of the automatic driving system indicates operating normally.

According to embodiments of the present disclosure, the application that controls the operation of the automatic driving system may determine that the operation information of the automatic driving system indicates operating normally, if the application does not receive a signal indicating abnormality from the respective device(s) in the automatic driving system.

In operation S230, the vehicle is controlled to present the target navigation path and a touch object used to switch an operation state of the automatic driving system, in response to the operation information indicating that the automatic driving system is in a normal state.

According to embodiments of the present disclosure, after the navigation system obtains the operation information indicating that the automatic driving system is in the normal state, both the target navigation path and the touch object used to switch an operation state of the automatic driving system may be presented on the presented electronic map through the display screen of the smart device. When presenting the target navigation path, the target road segment may be highlighted.

For example, the navigation system may transmit a request for switching the operation state of the automatic driving system to the application that controls the automatic driving system in the smart device, in response to the user performing an operation on the touch object used to switch the operation state of the automatic driving system. In this way, the application that controls the automatic driving system may transmit control instructions to the respective device(s) in the automatic driving system via the CAN bus to achieve the switching of the operation state of the automatic driving system.

For example, the touch object may be presented in edge areas of a presentation page, so as to avoid occlusion of the presented target navigation path. For example, the touch object may be presented in a left area, right area, top area, or bottom area of the display screen. The present position of the touch object may be set as desired, which is not limited in the present disclosure. In an embodiment, the touch object may be presented on the display screen close to a main driving area, so as to facilitate an operation of a driver.

For example, when highlighting the target road segment, for example, a line segment indicating the target road segment in the electronic map may be presented by using a highly saturated color, or the line segment indicating the target road segment in the electronic map may be presented in bold. For example, the line segment indicating the target road segment may be presented in eye-catching colors such as blue and yellow. In an embodiment, in addition to highlighting the target road segment, the electronic map may further present information for indicating congestion or an accident, for example.

In related art, entering a road segment that allows automatic driving or not is known by a user based on experience or the dashboard, and the automatic driving system is turned on through a hard button. With the above-mentioned method of the present disclosure, entering a road segment that allows automatic driving or not may be known by the user through the content presented on the display screen. It is also possible to turn on the automatic driving system by performing an operation on the touch object so that the vehicle enters an automatic driving mode, if it is known that the vehicle enters a road segment that allows automatic driving and the automatic driving needs or is desired to be enabled. Therefore, an effect of providing the user with an intuitive experience of automatic driving during a navigation process may be achieved, and the user experience in using the automatic driving system and the frequency of using the automatic driving system by the user may be improved.

According to embodiments of the present disclosure, when the target navigation path does not include a target road segment that allows automatic driving, the operation information of the automatic driving system does not have to be acquired, and the target navigation path is presented on the electronic map without presenting the touch object. In this way, it may prevent the automatic driving system from being turned on due to incorrect operation by the user on the touch object, which causes the vehicle to drive automatically on a road segment where automatic driving is not allowed.

According to embodiments of the present disclosure, for example, a default state of the touch object may be a first state which may be, for example, an off state. In this case, after the navigation system receives an operation that the user performs on the touch object, the touch object may be switched from the first state to a second state, which may be for example an "on" state. Accordingly, in the method of presenting information for a vehicle according to embodiments of the present disclosure, for example, "on" information may be transmitted to the automatic driving system in response to the touch object being switched from the first state to the second state, so that the operation state of the automatic driving system is switched from an off state to an on state. The "on" information may be transmitted to the automatic driving system through a CAN bus connected between the smart device and respective device(s) in the automatic driving system. Alternatively, it is also possible to transmit the "on" information to the application for controlling the automatic driving system, and the application for controlling the automatic driving system turns on and runs respective device(s) in the automatic driving system in response to receiving the "on" information, so that automatic driving of the vehicle is enabled.

According to embodiments of the present disclosure, when the touch object is in the second state, the touch object may be switched from the second state to the first state, which may be for example an "off" state, after the navigation system receives an operation performed by the user on the touch object. Accordingly, in the method of presenting information for a vehicle according to embodiments of the present disclosure, for example, "off" information may be transmitted to the automatic driving system in response to the touch object being switched from the second state to the first state, so that the operation state of the automatic driving system is switched from the on state to the off state. For example, the "off" information may be transmitted to the automatic driving system through the CAN bus connected between the smart device and the respective device(s) in the automatic driving system. Alternatively, it is also possible to transmit the "off" information to the application for controlling the automatic driving system, and the application for controlling the automatic driving system turns off the respective device(s) in the automatic driving system in response to receiving the "off" information, so that automatic driving of the vehicle is disabled.

Figure 3:
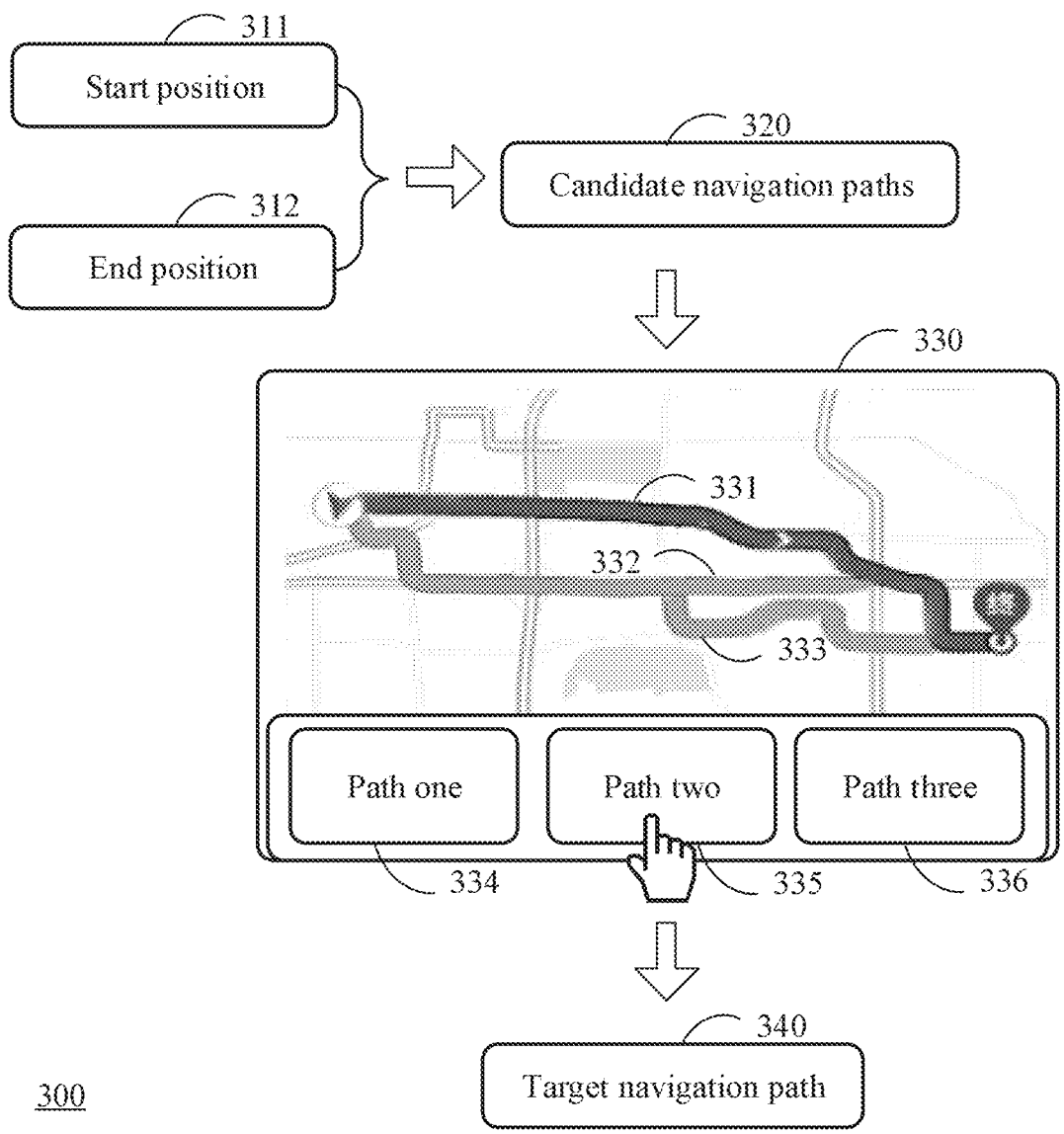
FIG. 3 shows a schematic diagram of a principle of acquiring a target navigation path according to embodiments of the present disclosure.

FIG. 3 shows a schematic diagram of a principle of acquiring a target navigation path according to embodiments of the present disclosure.

According to embodiments of the present disclosure, after acquiring the plurality of navigation paths transmitted by the server, the navigation system on the vehicle side may control the display screen in the vehicle to present the plurality of navigation paths as candidate navigation paths for the user to select. In order to achieve the presenting of the plurality of candidate navigation paths, the display screen may be controlled to present a thumbnail of or associated with the plurality of candidate navigation paths. When controlling the display screen to present the thumbnail, for example, a candidate navigation path including a target road segment may be highlighted, so that the user may easily select a path that allows automatic driving when the vehicle needs to be driven automatically.

For example, in the embodiment 300 shown in FIG. 3, when acquiring the target navigation path, firstly at least two candidate navigation paths 320 may be acquired according to a start position 311 and an end position 312, wherein each of the at least two candidate navigation paths includes a plurality of candidate road segments. For example, three candidate navigation paths may be acquired. After the candidate navigation paths 320 are obtained, a navigation path including the target road segment that allows automatic driving may be determined from the at least two candidate navigation paths, according to road segment information of the plurality of candidate road segments included in each candidate navigation path. Then, the display screen is controlled to present the thumbnail of the at least two candidate navigation paths. For example, when the number of the candidate navigation paths is three, a presentation page on which the thumbnail is presented may be a presentation page 330. A thumbnail of a candidate navigation path 331, a candidate navigation path 332, and a candidate navigation path 333 is presented on the presentation page 330. Finally, it is determined that a candidate navigation path selected from the at least two candidate navigation paths is the target navigation path. For example, in addition to the thumbnail of the candidate navigation paths 331 to 333 and the electronic map, for example, three selection controls corresponding to the three candidate navigation paths 331 to 333 one-to-one may be presented on the presentation page 330. The three selection control elements may include, for example, a "Path one" control element 334 corresponding to the candidate navigation path 331, a "Path two" control element 335 corresponding to the candidate navigation path 332, and a "Path three" control element 336 corresponding to the candidate navigation path 333. In this embodiment, in response to the user performing an operation on the "Path two" control element 335, the candidate navigation path 332 may be determined as the target navigation path 340.

According to embodiments of the present disclosure, when the candidate navigation paths includes a navigation path containing the target road segment and the thumbnail of the candidate navigation paths is presented, the candidate navigation path including the target road segment may be highlighted. In this way, it may provide richer information for the user to select the path. For example, when the user needs to drive the vehicle automatically due to fatigue driving, the highlighted path may be easily selected from the candidate navigation paths as the target navigation path.

According to embodiments of the present disclosure, when presenting the candidate navigation paths, for example, the display screen in the vehicle may also be controlled to present attribute information for each candidate navigation path. The attribute information may include, for example, an actual length of each candidate navigation path and a predicted time consumption for the vehicle to travel along each candidate navigation path. In this embodiment, the attribute information for each candidate navigation path may be presented through a control element corresponding to each candidate navigation path, for example.

In embodiments, for the candidate navigation path that includes the target road segment, for example, the display screen in the vehicle may also be controlled to present an actual length of the target road segment and a predicted time consumption for the vehicle to travel along the target road segment in the thumbnail. The predicted time consumption for the vehicle to travel along the target road segment may be determined based on the actual length of the target road segment and a maximum speed limit of the target road segment, or may be determined based on the actual length of the target road segment and a preset speed of the target road segment. The preset speed, for example, may be set by the user according to personal preferences, or the preset speed may be a default speed set when the vehicle leaves the factory. Through presenting the predicted time consumption for the vehicle to travel along the target road segment, it is possible for the user to know how long he/she would rest when he/she selects a navigation path including the target road segment.

Figure 4:
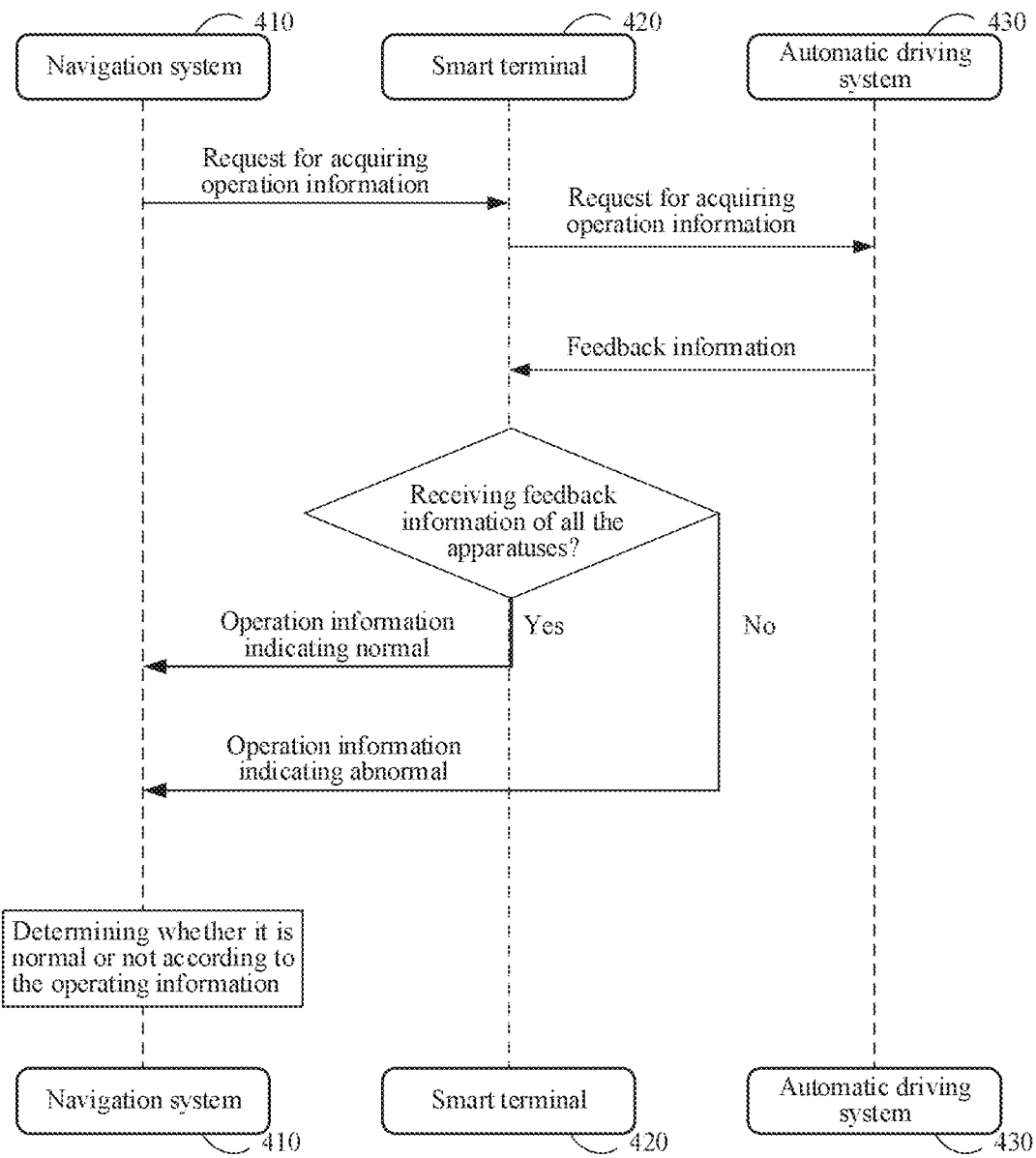
FIG. 4 shows a schematic diagram of a principle of acquiring operation information of an automatic driving system according to embodiments of the present disclosure.

FIG. 4 shows a schematic diagram of a principle of acquiring operation information of an automatic driving system according to embodiments of the present disclosure.

According to embodiments of the present disclosure, when acquiring operating information of the automatic driving system, the navigation system may communicate with the automatic driving system via the smart device on which the navigation system is installed. The smart device may communicate with the automatic driving system through the CAN bus.

For example, in the embodiment 400 shown in FIG. 4, when acquiring the operating information of the automatic driving system, a navigation system 410 may transmit a request for acquiring operation information to an operating system of a smart terminal 420. The operating system transmits the request for acquiring operation information received to the respective device(s) in the automatic driving system 430 via the CAN bus. After the respective device(s) in the automatic driving system 430 receives the request for acquiring operation information, if the respective device(s) is operating normally, the respective device(s) may return information to the smart terminal. If a device is operating abnormally, it may not receive or return information. Therefore, as shown in FIG. 4, the operating system of the smart terminal 420 may determine whether feedback information of all the device(s) in the automatic driving system 430 is received or not. If the feedback information of all the device(s) is received, it is determined that the automatic driving system is operating normally, and the operation information indicating that the automatic driving system is normal is transmitted to the navigation system. Otherwise, it is determined that the automatic driving system is operating abnormally, and the operation information indicating that the automatic driving system is abnormal is transmitted to the navigation system. Alternatively, the navigation system may also directly transmit a request for acquiring operation information to the automatic driving system by calling the API interface provided by the application for controlling the automatic driving system, and determine whether the automatic driving system is normal or not based on the operation information transmitted by the automatic driving system in response to the request for acquiring operation information. For example, if the navigation system receives feedback information as the operation information, it means that the automatic driving system is normal. If the feedback information as operation information is not received within a predetermined time period, it is determined that the automatic driving system is abnormal.

For example, when the navigation system transmits a request for acquiring operation information, for example, the request for acquiring operation information may be actively broadcast by calling an interface defined in the Android Interface Definition Language (AIDL), and the request for acquiring operation information contains a vehicle identification. If the automatic driving system in the vehicle is normal, it may recognize the vehicle identification in the request for acquiring operation information and return information. Accordingly, if the navigation system receives feedback information transmitted by the automatic driving system, it is determined that the automatic driving system is normal.

It may be understood that the abovementioned method of acquiring operation information of the automatic driving system is only used as an example to facilitate the understanding of the present disclosure, which is not limited in the present disclosure.

Figure 5:
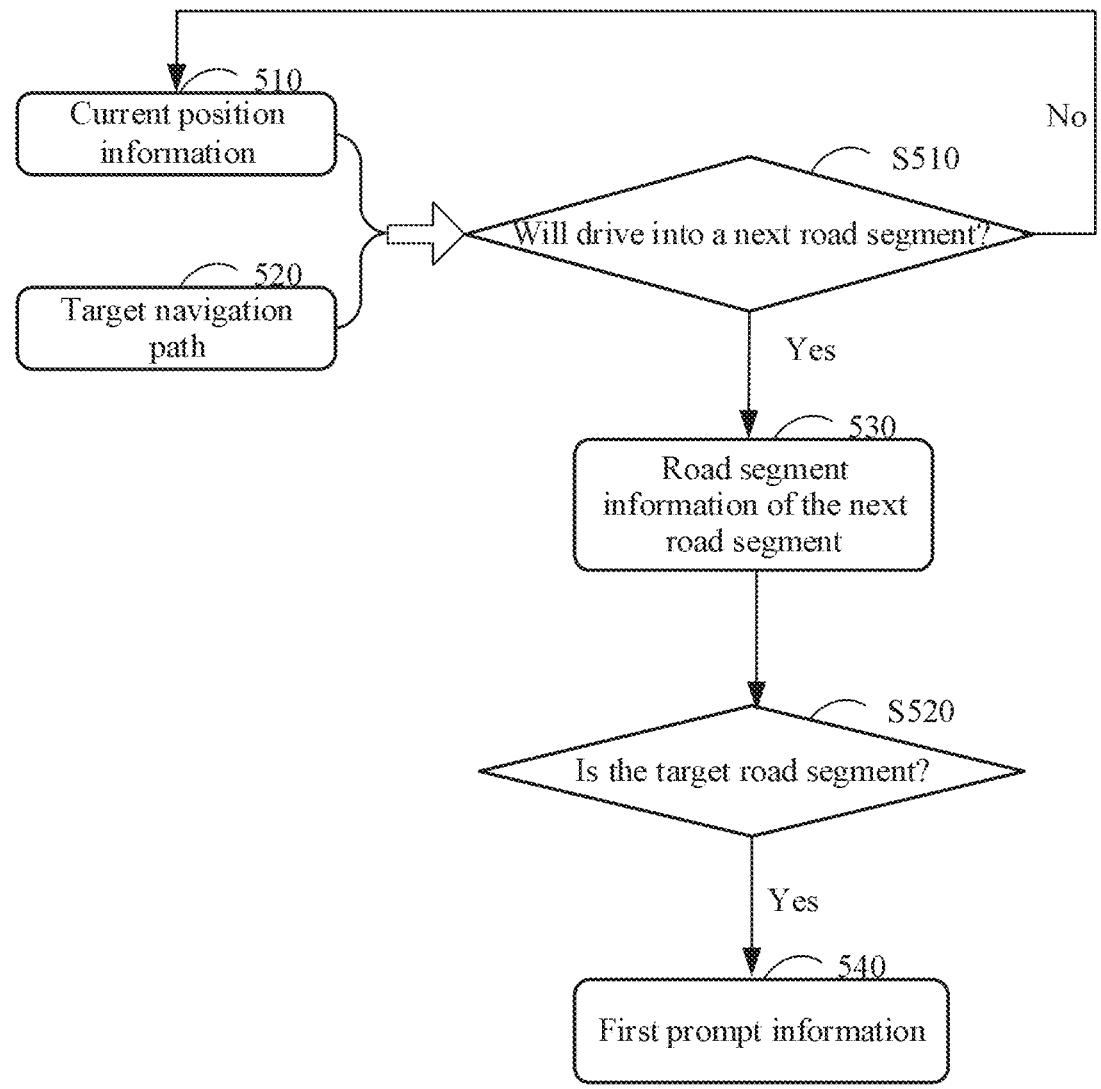
FIG. 5 shows a schematic diagram of a principle of a method of presenting information for a vehicle according to embodiments of the present disclosure.

FIG. 5 shows a schematic diagram of a principle of a method of presenting information for a vehicle according to embodiments of the present disclosure.

As shown in FIG. 5, the method 500 of presenting information for a vehicle according to embodiments of the present disclosure may also present prompt information on the display screen in the vehicle when the vehicle is going to enter the target road segment, so as to prompt the user to turn on the automatic driving mode of the vehicle, so that the user may take a proper rest to avoid fatigue driving.

As shown in FIG. 5, after presenting the target navigation path and the touch object, the navigation system may acquire current position information 510 for the vehicle in real time, for example. Then, it is determined whether the vehicle will drive into a next road segment from a road segment on which the vehicle is currently located in the plurality of road segments or not, according to a target navigation path 520 and the current position information 510 (that is, operation S510). For example, a distance between a current position of the vehicle and a starting point of the next road segment may be used to determine whether the vehicle will drive into the next road segment or not. If the distance between the current position of the vehicle and the starting point of the next road segment is less than a preset distance, it is determined that the vehicle will drive into the next road segment. In a case of driving into the next road segment, road segment information 530 of the next road segment is acquired. Otherwise, the current position information for the vehicle may continue to be acquired. After the road segment information 530 of the next road segment is obtained, whether the next road segment is the target road segment or not may be determined according to the road segment information 530 of the next road segment (that is, operation S520). If the road segment information 530 indicates that the next road segment is the target road segment, the display screen in the vehicle may be controlled to present a first prompt information 540 along with the target navigation path, in order to prompt the user to set the operation state of the automatic driving system to an "on" state. If the road segment information 530 indicates that the next road segment is not the target road segment, the display screen in the vehicle is controlled to present just the target navigation path. The first prompt information 540 may be presented in a prompt box that pops up from the electronic map page presented on the display screen. The first prompt information may be, for example, "Do you want to turn on automatic driving?", and the prompt box also presents a "Yes" control element and a "No" control element for the user to select. If the user selects the "Yes" control element, the navigation system may switch the touch object from a first state to a second state, so as to achieve the state switching of the automatic driving system. If the user selects the "No" control element, the navigation system may not perform the operation of switching the state of the touch object.

Similarly, the navigation system may continue to acquire the current position information for the vehicle after the touch object is in the second state. When it is determined, according to the current position information 510 and the target navigation path 520, that the vehicle will drive into a next road segment from a road segment on which the vehicle is currently located and the next road segment does not include the target road segment, the display screen in the vehicle may be controlled to present a second prompt information along with the target navigation path. The second prompt information is used to prompt the user to switch the operation state of the automatic driving system from the on state to an off state. For example, the second prompt information may be presented in a prompt box that pops up from the electronic map page presented on the display screen. The second prompt information may be, for example, "Do you want to turn off automatic driving?", and the prompt box also presents a "Yes" control element and a "No" control element for the user to select. If the user selects the "Yes" control element, the navigation system may switch the touch object from the second state to the first state to achieve the state switching of the automatic driving system. If the user selects the "No" control element, the navigation system may not perform the operation of switching the state of the touch object.

According to the method described above, embodiments of the present disclosure may achieve an effect of prompting the user to turn on automatic driving when the vehicle is about to enter the target road segment, thereby further improving the user experience of the user using the automatic driving function. Furthermore, the user may be prompted to turn off automatic driving when the vehicle is going to leave the target road segment, so as to prevent the vehicle from automatically driving into a road segment that does not allow automatic driving due to the user's failure of disabling the automatic driving in time, thereby reducing the occurrence of traffic violation incidents.

According to embodiments of the present disclosure, when the automatic driving system is abnormal or an environment where the vehicle is located has an extreme event, the second prompt information may also be presented along with the navigation path to prompt the user to take over the driving of the vehicle in time, so as to avoid traffic accidents.

For example, the navigation system may control the display screen in the vehicle to present the second prompt information in response to receiving from the automatic driving system the operating information indicating that the automatic driving system is abnormal. Accordingly, the respective device(s) in the automatic driving system may transmit an abnormality notification to the navigation system through the interface, for example, defined by AIDL described above when the respective device(s) has a fault during operating, and the navigation system determines that the automatic driving system is abnormal when receiving the abnormality notification.

For example, the environment in which the vehicle is located may be determined according to, for example, an image taken by a camera in the automatic driving system. For example, the smart device may acquire the image taken by the camera, and determine whether an extreme event exist in the environment in which the vehicle is located or not by using an image recognition technology. For example, it is determined whether abnormal conditions such as landslides, traffic accidents, etc. on the road ahead exist or not, and whether heavy rain, snow, or heavy fog in the weather exists or not. If the extreme event exists, the display screen in the vehicle is controlled to present the second prompt information.

According to embodiments of the present disclosure, the navigation system may also communicate with the dashboard of the vehicle via the smart device, for example. After controlling the display screen to present both the second prompt information and the target navigation path, it is also possible to provide a prompt of switching the operation state of the automatic driving system from the on state to the off state to the user by using the dashboard through interacting with the dashboard. Alternatively, a voice prompt may also be issued to the user through the navigation system. In this way, multiple prompts to the user are achieved, so as to avoid violations of traffic rules and traffic accidents due to the user's failure of noticing the navigation page to take over the driving of the vehicle in time.

For example, the automatic driving system applied to the vehicle of this embodiment may transmit warning information to the dashboard of the vehicle in a case that the display screen in the vehicle is controlled to present the navigation path and the second prompt information, so that the dashboard provides a prompt of switching the operation state of the automatic driving system from the on state to the off state to the user according to the warning information. For example, the interaction with the dashboard may be achieved by calling the interface defined by AIDL.

According to embodiments of the present disclosure, with the method of presenting information for a vehicle in this embodiment, it is also possible to directly control the touch object to be switched from the second state to the first state when it is determined that the user needs to take over driving, so as to turn off the automatic driving of the vehicle in time to avoid accidents.

For example, after the vehicle travels through the target navigation path, or after the navigation function of the vehicle is normally exited or abnormally closed, the touch object may be directly controlled to switch from the second state to the first state. Therefore, it may avoid unnecessary power loss due to the fact that after the vehicle travels through the target navigation path in a manner of automatic driving, the vehicle is unable to drive automatically without navigation but the automatic driving system of the vehicle is still in an on state.

For example, after receiving the operating information transmitted by the automatic driving system indicating that the automatic driving system is operating abnormally, the touch object may be directly controlled to switch from the second state to the first state. Therefore, it is possible to avoid accidents caused by inaccurate positioning and inaccurate determination of road conditions due to the continuation of automatic driving under an abnormal automatic driving system.

For example, after the target navigation path is re-planned due to road congestion, the touch object may be directly controlled to switch from the second state to the first state. In this way, it is possible to avoid the violence of traffic rules due to the automatic driving not being allowed in the re-planned path.

For example, when it is determined that remaining road segments subsequent to a road segment on which the vehicle is currently located in the target navigation path do not include a closed road segment according to road segment information of the remaining road segments, the touch object may be directly controlled to switch from the second state to the first state. In this way, it is possible to avoid an accident due to the fact that the automatic driving system cannot control the vehicle in time to avoid the vehicle suddenly entering the unclosed road segments.

According to embodiments of the present disclosure, after controlling the touch object to switch from the second state to the first state, the display screen in the vehicle may also be controlled to cancel the present of the touch object. When the display screen in the vehicle is controlled to present the navigation path again and the automatic driving system is normal, the display screen is controlled to present the touch object again. In this way, it is possible to prevent the vehicle from entering the automatic driving state, and potentially causing an accident, due to an accidental touch of the touch object by the user in a condition of the automatic driving of the vehicle not being allowed.

According to embodiments of the present disclosure, in a case that the automatic driving system is turned off due to the re-planning of the target navigation path and the display screen is controlled to cancel the presence of the touch object, the re-planned path usually includes the road segment on which the vehicle is currently located and the road segment on which the vehicle is currently located allows automatic driving. In this case, after the display screen is controlled to present the touch object again, the user usually chooses to make the vehicle drive automatically again. Therefore, in this embodiment, firstly a state of the touch object may be recorded as the second state when the target navigation path is re-planned. Then, when the display screen is controlled to present the touch object again, it is determined whether a recorded state of the touch object exists or not. If the recorded state of the touch object exists and the road segment on which the vehicle is currently located is the target road segment, the touch object is controlled to automatically switch from the default first state to the second state. Through this embodiment, when the vehicle re-plans the path and satisfies automatic driving conditions, the vehicle may be driven automatically without the user's operation again. Therefore, the intelligence of the vehicle may be further improved, and the user experience may be improved.

Similarly, after the user chooses to drive the vehicle automatically, it generally indicates that the user likes to experience automatic driving. Therefore, when the automatic driving system is turned off due to the abnormally closed navigation function of the vehicle and the presence of the touch object is cancelled, the user usually chooses to continue the automatic driving of the vehicle after restarting the navigation function. Therefore, in this embodiment, firstly a state of the touch object may be recorded as the second state when the navigation system is turned off abnormally. Then, when the navigation system restarts and the touch object is presented again, it may be first determined whether a recorded state of the touch object exists or not. If the recorded state of the touch object exists and the road segment on which the vehicle is currently located is the target road segment, the touch object is controlled to automatically switch from the default first state to the second state. Through this embodiment, when the navigation system of the vehicle restarts and the vehicle satisfies automatic driving conditions, the vehicle may be driven automatically without the user's operation again. Therefore, the intelligence of the vehicle may be further improved, and the user experience may be improved.

For example, the navigation system may determine whether the navigation system exits abnormally or normally or not according to whether a navigation record is cleared or not. If the navigation record is cleared, it is determined that the navigation system exits normally due to the end of the navigation. If the navigation record is not cleared, it is determined that the navigation system exits abnormally due to an abnormal situation. The abnormal situation may be, for example, a situation that the vehicle power offs due to stalling, the memory of the smart device is insufficient, and/or the like.

According to the above-mentioned method of presenting information for a vehicle, the present disclosure further provides an apparatus of presenting information for a vehicle. Hereinafter, an apparatus of presenting information for a vehicle provided in the present disclosure will be described with reference to FIG. 6.

Figure 6:
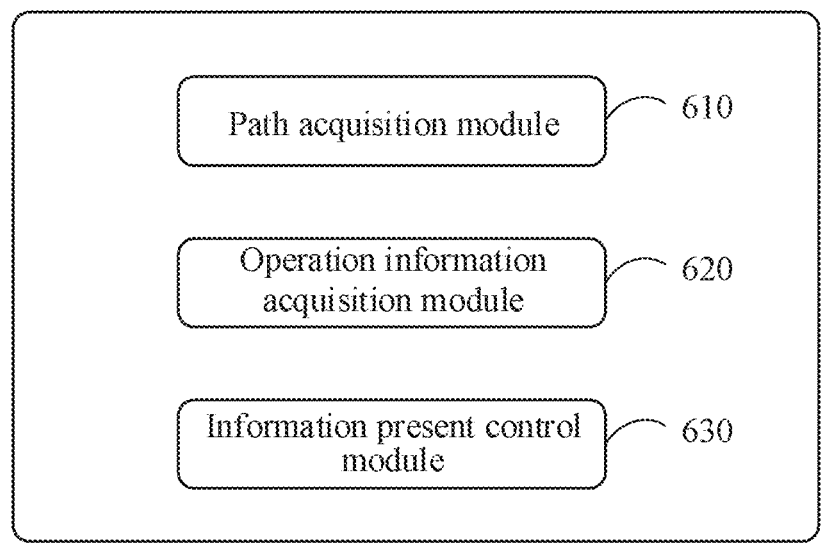
FIG. 6 shows a structural block diagram of an apparatus of presenting information for a vehicle according to embodiments of the present disclosure.

FIG. 6 shows a structural block diagram of an apparatus of presenting information for a vehicle according to embodiments of the present disclosure.

As shown in FIG. 6, the device 600 of presenting information for a vehicle of this embodiment may include a path acquisition module 610, an operation information acquisition module 620, and an information present control module 630.

The path acquisition module 610 is used to acquire a target navigation path, in which the target navigation path includes a plurality of road segments. In an embodiment, the path acquisition module 610 may be used to perform the operation S210 described above, for example, and details are not described herein again.

The operation information acquisition module 620 is used to a acquire operation information of an automatic driving system of the vehicle, in response to determining that the plurality of road segments include a target road segment that allows automatic driving. In an embodiment, the operation information acquisition module 620 may be used to perform the operation S220 described above, for example, and details are not described herein again.

The information present control module 630 is used to control the vehicle to present the target navigation path and a touch object used to switch an operation state of the automatic driving system, in response to the operation information indicating that the automatic driving system is in a normal state. The target road segment in the presented target navigation path is highlighted. In an embodiment, the information present control module 630 may be used to perform the operation S230 described above, for example, and details are not described herein again.

Collecting, storing, using, processing, transmitting, providing, and disclosing etc. of the personal information of the user involved in the present disclosure all comply with the relevant laws and regulations, and do not violate the public order and morals.

Figure 7:
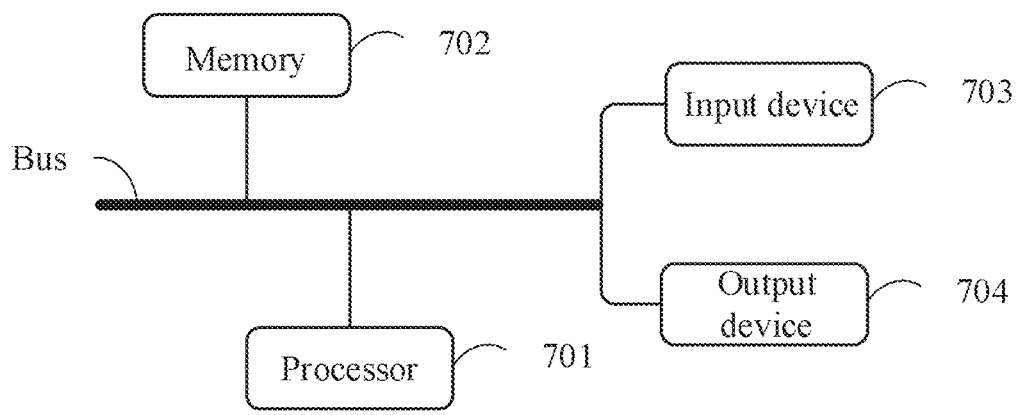
FIG. 7 shows a block diagram of an electronic device used to implement the method of presenting information for a vehicle according to embodiments of the present disclosure.

FIG. 7 shows a block diagram of an electronic device used to implement the method of presenting information for a vehicle according to embodiments of the present disclosure.

According to embodiments of the present disclosure, the present disclosure further provides an electronic device and a readable storage medium.

FIG. 7 shows a block diagram of an electronic device implementing the method of presenting information for a vehicle. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components, connections and relationships between the components, and functions of the components in the present disclosure are merely examples, and are not intended to limit the implementation of the present disclosure described and/or required herein.

As shown in FIG. 7, the electronic device 700 may include one or more processors 701, a memory 702, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 7, a processor 701 is illustrated by way of an example.

The memory 702 is a non-transitory computer-readable storage medium provided by the present disclosure. The memory stores instructions executable by at least one processor, so that the at least one processor executes the method of presenting information for a vehicle provided by the present disclosure. The non-transitory computer-readable storage medium of the present disclosure stores computer instructions for allowing a computer to execute the method of presenting information for a vehicle provided by the present disclosure.

The memory 702, as a non-transitory computer-readable storage medium, may be used to store non-transitory software programs, non-transitory computer-executable programs and modules, such as program instructions/modules corresponding to the method of presenting information for a vehicle in embodiments of the present disclosure (for example, the path acquisition module 610, the operation information acquisition module 620, and the information present control module 630 shown in the FIG. 6). The processor 701 executes various functional applications and data processing of the server by executing the non-transient software programs, instructions and modules stored in the memory 702, thereby implementing the method of presenting information for a vehicle in the method embodiments described above.

The memory 702 may include a program storage area and a data storage area. The program storage area may store an operating system and an application program required by at least one function. The data storage area may store data etc. generated according to the using of the electronic device implementing the method of presenting information for a vehicle. In addition, the memory 702 may include a high-speed random access memory, and may further include a non-transitory memory, such as at least one magnetic disk storage device, a flash memory device, or other non-transitory solid-state storage devices. In some embodiments, the memory 702 may optionally include a memory provided remotely with respect to the processor 701, and such remote memory may be connected through a network to the electronic device implementing the method of presenting information for a vehicle. Examples of the above-mentioned network include, but are not limited to, the internet, intranet, local area network, mobile communication network, and combination thereof.

The electronic device implementing the method of presenting information for a vehicle may further include an input device 703 and an output device 704. The processor 701, the memory 702, the input device 703 and the output device 704 may be connected by a bus or in other manners. In FIG. 7, the connection by a bus is illustrated by way of an example.

The input device 703 may receive an input number or character information, and generate key input signals related to user settings and function control of the electronic device implementing the method of presenting information for a vehicle, and the input device 703 may be such as a touch screen, a keypad, a mouse, a track pad, a touchpad, a pointing stick, one or more mouse buttons, a trackball, a joystick, and so on. The output device 704 may include a display apparatus, an auxiliary lighting device (for example, LED), a tactile feedback device (for example, a vibration motor), and the like. The display apparatus may include, but is not limited to, a liquid crystal display (LCD), a light-emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred to as programs, software, software applications, or codes) contain machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, a magnetic disk, an optical disk, a memory, a programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, a visual feedback, an auditory feedback, or a tactile feedback), and the input from the user may be received in any form (including an acoustic input, a voice input or a tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), internet and a blockchain network.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server in combination with block chains.

According to the method and apparatus of presenting information for a vehicle, an electronic device, and a storage medium provided by the present disclosure described above, the navigation function may be bound with the automatic driving function of the vehicle. In this way, the user may be given an intuitive feeling of automatic driving, and the frequency and the user experience of the user using the automatic driving function of the vehicle may be improved. Therefore, it may provide favorable support for a navigation system implementing the method of presenting information for a vehicle according to the present disclosure to be selected by more car manufacturers.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of presenting information for a vehicle, the method comprising:
    acquiring a target navigation path, wherein the target navigation path comprises a plurality of road segments;
    acquiring operation information of an automatic driving system of a vehicle, in response to determining that the plurality of road segments comprise a target road segment that allows automatic driving;
    controlling the vehicle to present the target navigation path and a touch object, in response to the operation information indicating that the automatic driving system is in a normal state, wherein the touch object is configured to be operated so as to switch the automatic driving system between an on state and an off state and wherein the target road segment in the presented target navigation path is highlighted;
    acquiring current position information of the vehicle;
    in response to determining that the vehicle will drive into a next road segment from a road segment on which the vehicle is currently located in the plurality of road segments according to the target navigation path and the current position information, acquiring road segment information of the next road segment; and
    in response to the road segment information of the next road segment indicating that the next road segment is the target road segment, controlling the vehicle to present first prompt information along with the target navigation path, to prompt a user to set the operation state of the automatic driving system to an on state.

2. The method of claim 1, wherein the acquiring a target navigation path comprises:
    acquiring at least two candidate navigation paths according to a start position and an end position, wherein each of the at least two candidate navigation paths comprises a plurality of candidate road segments;
    determining, from the at least two candidate navigation paths, a candidate navigation path comprising the target road segment that allows automatic driving, according to road segment information of the plurality of candidate road segments;
    controlling the vehicle to present a thumbnail of or associated with the at least two candidate navigation paths; and
    determining a candidate navigation path which is selected from the at least two candidate navigation paths, as the target navigation path, wherein in controlling the vehicle to present the thumbnail, the candidate navigation path comprising the target road segment is highlighted.

3. The method of claim 2, further comprising, for the candidate navigation path comprising the target road segment, controlling the vehicle to present an actual length of the target road segment and a predicted time consumption for the vehicle to travel along the target road segment.

4. The method of claim 1, further comprising:
    in response to the touch object being switched from a first state to a second state, transmitting on information to the automatic driving system, so that the operation state of the automatic driving system is switched from an off state to an on state; and
    in response to the touch object being switched from the second state to the first state, transmitting off information to the automatic driving system, so that the operation state of the automatic driving system is switched from an on state to an off state.

5. The method of claim 4, further comprising controlling to switch the touch object from the second state to the first state and controlling the vehicle to cancel the presenting of the touch object, in response to the touch object being in the second state and at least one selected from:
    the vehicle travelling through the target navigation path;
    operation information indicating that the automatic driving system is abnormal being received from the automatic driving system;
    a navigation function of the vehicle being turned off;
    the target navigation path being re-planned; and/or
    a determination that remaining road segments subsequent to a road segment on which the vehicle is currently located in the target navigation path do not comprise a closed road segment according to road segment information of the remaining road segments.

6. The method of claim 5, further comprising in response to the target navigation path being re-planned and/or the navigation function of the vehicle being abnormally closed,
    recording a state of the touch object as the second state; and
    in response to controlling the vehicle to present the touch object again after canceling the presenting of the touch object:
        determining whether a recorded state of the touch object exists or not; and
        controlling the touch object to be switched from the first state to the second state, in response to the recorded state of the touch object exists and the road segment on which the vehicle is currently located is the target road segment.

7. The method of claim 4, further comprising controlling the vehicle to present second prompt information, which is used to prompt a user to switch the operation state of the automatic driving system from an on state to an off state, along with the target navigation path, in response to the touch object being in the second state and at least one selected from:
    a determination that the vehicle will drive into a next road segment from a road segment on which the vehicle is currently located and the next road segment does not comprise the target road segment, according to the target navigation path and the current position information of the vehicle;
    operation information indicating that the automatic driving system is abnormal being received from the automatic driving system; and/or an environment in which the vehicle is located having an extreme event.

8. The method of claim 7, further comprising, in controlling the vehicle to present second prompt information along with the target navigation path, transmitting warning information to a dashboard of the vehicle, so that the dashboard prompts the user to switch the operation state of the automatic driving system from the on state to the off state according to the warning information.

9. The method of claim 1, wherein the acquiring operation information of an automatic driving system of the vehicle comprises:
  transmitting a request for acquiring operation information to the automatic driving system; and
  receiving the operation information, which is transmitted by the automatic driving system in response to the request for acquiring operation information,
  wherein in response to the operation information not being received within a predetermined time period, determining that the automatic driving system is abnormal.

10. An electronic device, comprising:
  at least one processor; and
  a memory communicatively connected to the at least one processor, wherein the memory stores instructions executable by the at least one processor, and the instructions, when executed by the at least one processor, cause the at least one processor to at least:
    acquire a target navigation path, wherein the target navigation path comprises a plurality of road segments;
    acquire operation information of an automatic driving system of a vehicle, in response to determination that the plurality of road segments comprise a target road segment that allows automatic driving;
    control the vehicle to present the target navigation path and a touch object, in response to the operation information indicating that the automatic driving system is in a normal state, wherein the touch object is configured to be operated so as to switch the automatic driving system between an on state and an off state and wherein the target road segment in the presented target navigation path is highlighted;
    acquire current position information of the vehicle;
    in response to determination that the vehicle will drive into a next road segment from a road segment on which the vehicle is currently located in the plurality of road segments according to the target navigation path and the current position information, acquire road segment information of the next road segment; and
    in response to the road segment information of the next road segment indicating that the next road segment is the target road segment, control the vehicle to present first prompt information along with the target navigation path, to prompt a user to set the operation state of the automatic driving system to an on state.

11. The electronic device of claim 10, wherein the at least one processor is further configured to:
  acquire at least two candidate navigation paths according to a start position and an end position, wherein each of the at least two candidate navigation paths comprises a plurality of candidate road segments;
  determine, from the at least two candidate navigation paths, a candidate navigation path that comprises the target road segment that allows automatic driving, according to road segment information of the plurality of candidate road segments;
  control the vehicle to present a thumbnail of or associated with the at least two candidate navigation paths; and
  determine a candidate navigation path which is selected from the at least two candidate navigation paths, as the target navigation path,
  wherein in controlling the vehicle to present the thumbnail, a candidate navigation path including the target road segment is highlighted.

12. The electronic device of claim 11, wherein the at least one processor is further configured to, for the candidate navigation path comprising the target road segment, control the vehicle to present an actual length of the target road segment and a predicted time consumption for the vehicle to travel along the target road segment.

13. The electronic device of claim 10, wherein the at least one processor is further configured to:
  in response to the touch object being switched from a first state to a second state, transmit on information to the automatic driving system, so that the operation state of the automatic driving system is switched from an off state to an on state; and
  in response to the touch object being switched from the second state to the first state, transmit off information to the automatic driving system, so that the operation state of the automatic driving system is switched from an on state to an off state.

14. The electronic device of claim 13, wherein the at least one processor is further configured to control to switch the touch object from the second state to the first state and control the vehicle to cancel the presentation of the touch object, in response to the touch object being in the second state and at least one selected from:
  the vehicle travelling through the target navigation path;
  operation information indicating that the automatic driving system is abnormal being received from the automatic driving system;
  a navigation function of the vehicle being turned off;
  the target navigation path being re-planned; and/or
  a determination that remaining road segments subsequent to a road segment on which the vehicle is currently located in the target navigation path do not comprise a closed road segment according to road segment information of the remaining road segments.

15. The electronic device of claim 14, wherein the at least one processor is further configured to, in response to the target navigation path being re-planned and/or the navigation function of the vehicle being abnormally closed,
  record a state of the touch object as the second state; and
  in response to control of the vehicle to present the touch object again after canceling the presentation of the touch object:
    determine whether a recorded state of the touch object exists or not; and
    control the touch object to be switched from the first state to the second state, in response to the recorded state of the touch object existing and the road segment on which the vehicle is currently located is the target road segment.

16. The electronic device of claim 13, wherein the at least one processor is further configured to control the vehicle to present second prompt information, which is used to prompt a user to switch the operation state of the automatic driving system from an on state to an off state, along with the target navigation path, in response to the touch object being in the second state and at least one selected from:

a determination that the vehicle will drive into a next road segment from a road segment on which the vehicle is currently located and the next road segment does not comprise the target road segment, according to the target navigation path and the current position information of the vehicle;

operation information indicating that the automatic driving system is abnormal being received from the automatic driving system; and/or an environment in which the vehicle is located having an extreme event.

17. The electronic device of claim 16, wherein the at least one processor is further configured to, in control of the vehicle to present second prompt information along with the target navigation path, transmit warning information to a dashboard of the vehicle, so that the dashboard prompts the user to switch the operation state of the automatic driving system from the on state to the off state according to the warning information.

18. A non-transitory computer-readable storage medium having computer instructions therein, the computer instructions, when executed by a computer system, configured to cause the computer system to at least:

acquire a target navigation path, wherein the target navigation path comprises a plurality of road segments;

acquire operation information of an automatic driving system of a vehicle, in response to determining that the plurality of road segments comprise a target road segment that allows automatic driving;

control the vehicle to present the target navigation path and a touch object, in response to the operation information indicating that the automatic driving system is in a normal state, wherein the touch object is configured to be operated so as to switch the automatic driving system between an on state and an off state and wherein the target road segment in the presented target navigation path is highlighted;

acquire current position information of the vehicle;

in response to determination that the vehicle will drive into a next road segment from a road segment on which the vehicle is currently located in the plurality of road segments according to the target navigation path and the current position information, acquire road segment information of the next road segment; and in response to the road segment information of the next road segment indicating that the next road segment is the target road segment, control the vehicle to present first prompt information along with the target navigation path, to prompt a user to set the operation state of the automatic driving system to an on state.

19. The medium of claim 18, wherein the instructions configured to cause the computer system to acquire a target navigation path are further configured to cause the computer system to:

acquire at least two candidate navigation paths according to a start position and an end position, wherein each of the at least two candidate navigation paths comprises a plurality of candidate road segments;

determine, from the at least two candidate navigation paths, a candidate navigation path comprising the target road segment that allows automatic driving, according to road segment information of the plurality of candidate road segments;

control the vehicle to present a thumbnail of or associated with the at least two candidate navigation paths; and determine a candidate navigation path which is selected from the at least two candidate navigation paths, as the target navigation path, wherein in control of the vehicle to present the thumbnail, the candidate navigation path comprising the target road segment is highlighted.

20. The medium of claim 18, wherein the instructions configured to cause the computer system to acquire operation information of an automatic driving system of the vehicle are further configured to cause the computer system to:

transmit a request for acquiring operation information to the automatic driving system; and receive the operation information, which is transmitted by the automatic driving system in response to the request for acquisition of operation information, wherein in response to the operation information not being received within a predetermined time period, determine that the automatic driving system is abnormal.

* * * * *